United States Patent
Knoedgen et al.

(10) Patent No.: US 9,541,933 B2
(45) Date of Patent: Jan. 10, 2017

(54) HIGH SPEED REGULATOR WITH LOW CAPACITOR VALUES

(71) Applicant: Dialog Semiconductor GmbH, Kirchheim/Teck-Nabern (DE)

(72) Inventors: Horst Knoedgen, Munich (DE); Frank Kronmueller, Neudenau (DE)

(73) Assignee: Dialog Semiconductor (UK) Limited, London (GB)

( * ) Notice: Subject to any disclaimer, the term of this patent is extended or adjusted under 35 U.S.C. 154(b) by 123 days.

(21) Appl. No.: 14/550,923

(22) Filed: Nov. 22, 2014

(65) Prior Publication Data

US 2015/0227146 A1    Aug. 13, 2015

(30) Foreign Application Priority Data

Feb. 13, 2014    (EP) ..................................... 14154970

(51) Int. Cl.
*G05F 5/00*      (2006.01)
*G05F 1/445*     (2006.01)
*H02M 3/156*     (2006.01)
*G05F 1/575*     (2006.01)
*H02M 1/00*      (2006.01)

(52) U.S. Cl.
CPC .............. *G05F 1/575* (2013.01); *H02M 3/156* (2013.01); *H02M 2001/0019* (2013.01); *H02M 2001/0045* (2013.01); *H02M 2003/1566* (2013.01)

(58) Field of Classification Search
CPC .......... G05F 1/461; G05F 1/562; G05F 1/575; G05F 1/59; G05F 1/595

USPC .. 323/299, 300, 303, 350, 351, 353; 363/53, 363/55–56.03, 56.1, 58, 73
See application file for complete search history.

(56) References Cited

U.S. PATENT DOCUMENTS

| | | | | |
|---|---|---|---|---|
| 5,926,384 | A | * | 7/1999 | Jochum ............... H02M 3/1584 361/90 |
| 6,717,389 | B1 | | 4/2004 | Johnson |
| 2002/0015319 | A1 | * | 2/2002 | Hartular ............... H02M 3/1584 363/56.05 |
| 2009/0302813 | A1 | | 12/2009 | Schoofs |

(Continued)

OTHER PUBLICATIONS

European Search Report, 14154970.9-1804, Mailed: Aug. 21, 2014, Dialog Semiconductor GmbH.

*Primary Examiner* — Adolf Berhane
*Assistant Examiner* — Gary Nash
(74) *Attorney, Agent, or Firm* — Saile Ackerman LLC; Stephen B. Ackerman

(57) ABSTRACT

The present document relates to voltage regulators. In particular, the present document relates to a method and a corresponding voltage regulator with improved performance subject to load transients. A regulator configured to provide a load current at an output voltage in dependence of an input voltage is described. The regulator comprises a core regulator configured to provide a core current at a core output voltage in dependence of the input voltage. Furthermore, the regulator comprises current sensing means configured to provide an indication of the core current. The output voltage is dependent on the core output voltage and on a voltage drop at the current sensing means. In addition, the regulator comprises a current source configured to provide an auxiliary current based on the indication of the core current. The load current is dependent on the core current and on the auxiliary current.

20 Claims, 5 Drawing Sheets

(56) References Cited

U.S. PATENT DOCUMENTS

2012/0055254 A1* 3/2012 Yamaguchi ............ B06B 1/0207
73/649

* cited by examiner

HIGH SPEED REGULATOR WITH LOW CAPACITOR VALUES

TECHNICAL FIELD

The present document relates to voltage regulators. In particular, the present document relates to a method and a corresponding voltage regulator with improved performance subject to load transients.

BACKGROUND

Voltage regulators typically have a finite transient response capability. Linear regulators may be limited by bandwidth and pass device size. As a result of this, linear regulators may exhibit voltage drops or voltage peaks, subject to load transients of a load connected to an output of the voltage regulator.

As possible approach to reducing such voltage drops or voltage peaks is the use of an output capacitor for the provision of additional load current and/or for the storage of excessive current at the output of the regulator. Such output capacitors typically lead to additional costs and additional space requirements.

The present document addresses the above mentioned technical problem. In particular, the present document describes a voltage regulator and a corresponding method for reducing the error voltage $V_{error}$ of the voltage regulator, subject to a load transient, without the need of (substantial) output capacitors.

SUMMARY

According to an aspect, a regulator, e.g. a linear drop-out regulator (LDO), configured to provide a load current at an output voltage in dependence of an input voltage is described. The output voltage may be a regulated output voltage. In other words, the regulator may be configured to maintain the output voltage at a pre-determined level (e.g. at the level of the input voltage, or at a level which is proportional to the level of the input voltage) for different load currents. In yet other words, the regulator may be configured to maintain the output voltage within pre-determined bounds, even subject to positive or negative load current transients.

The regulator comprises a core regulator configured to provide a core current at a core output voltage in dependence of the input voltage. The core output voltage may be a regulated output voltage. In other words, the core regulator may be configured to maintain the core output voltage within pre-determined bounds for different core currents.

By way of example, the core regulator may comprise a core amplifier configured to provide the core current at the core output voltage. The core amplifier may comprise a differential amplifier. Furthermore, the core regulator may comprise a (e.g. negative) voltage feedback loop configured to feed back an indication of the core output voltage to an input of the core amplifier. In particular, the core output voltage may be fed back to a negative input of the core amplifier. As a result of this, the core regulator may be configured to regulate the core output voltage in dependence of or based on the input voltage. In particular, the core output voltage may be regulated based on a core input voltage at the input of the core regulator, wherein the core input voltage may be an offset version of the input voltage.

Alternatively or in addition, the core regulator may comprise a switched mode power supply configured to derive a (regulated) core output voltage from the core input voltage. The switched mode power supply may comprise an inductive element (e.g. a transformer or an inductor). Example switched mode power supplies are a buck converter, a boost converter, a buck-boost converter, a flyback converter, a Single-ended primary-inductor converter, etc.

Furthermore, the core regulator may comprise a decoupling capacitor at the output of the core amplifier. The decoupling capacitor may be used to stabilize the core output voltage, in case of variations of the core current. As will be outlined below, the core current typically constitutes only a small fraction of the total load current which is provided by the regulator. Consequently, the decoupling capacitor may have a relatively low capacitance value.

The regulator further comprises current sensing means configured to provide an indication of the core current. The current sensing means may comprise a sensing resistor which is traversed by the core current. Hence, the indication of the core current may comprise (or may correspond to) a voltage drop at the sensing resistor. In other words, the indication of the core current may comprise a value (e.g. a voltage level) which is proportional to the core current.

Alternatively or in addition, the current sensing means may comprise a transistor (e.g. a metal oxide semiconductor, MOS, transistor). The transistor may act as a variable resistor. As such, the current sensing means may comprise a sensing element having a variable resistance. The resistance of the sensing element may be adapted in dependence of a level of the load of the regulator and/or in dependence of a (expected) gradient of the load of the regulator. The regulator may be configured to receive an indication for the fact that a load transient, i.e. a change of the load, is expected. As a result of this, the regulator may increase the variable resistance of the sensing element, in order to provide a reliable indication of the core current. On the other hand, if no load transient is expected, the variable resistance of the sensing element may be set to a low value (e.g. the transistor may be fully opened). By doing this, the power losses of the regulator may be reduced, while at the same time providing a fast response to load transients.

As such, the sensing resistor may be adjustable and the regulator may be configured to adjust the sensing resistor in dependence of the load current (e.g. in dependent of a gradient of the load current).

The regulator may be arranged such that the output voltage of the regulator is dependent on the core output voltage (provided by the core regulator) and on a voltage drop at the current sensing means. In particular, the output voltage may be dependent on (e.g. may correspond to) the core output voltage minus the voltage drop at the current sensing means. The voltage drop at the current sensing means may correspond to the indication of the core current, which is generated by the current sensing means.

In addition, the regulator comprises a current source configured to provide an auxiliary current based on the indication of the core current. In particular, the current source may be configured to provide an auxiliary current which is proportional to the indication of the core current. Even more particularly, the current source (possibly in conjunction with the current sensing means) may be configured to provide an auxiliary current which is proportional to the core current. The proportionality factor may be referred to as a gain of the current source. By way of example, the auxiliary current may be at least 10 or 20 times higher than the core current.

The regulator may be arranged such that the load current is dependent on the core current and on the auxiliary current.

In particular, the load current may be dependent on (e.g. may correspond to) the sum of the core current and of the auxiliary current.

Hence, the regulator comprises a first regulation loop (also referred to as a voltage loop) for regulating the core output voltage. The core output voltage yields the output voltage of the regulator. Furthermore, the regulator comprises a second regulation loop (also referred to as a current loop) for regulating the provision of an auxiliary current to yield the required load current. The use of such at least two regulation loops allows the provision of a regulator which is configured to react rapidly to load current transients while maintaining the output voltage within tight pre-determined bounds. This may be achieved without the need for a (significant) output capacitor.

As indicated above, the indication of the core current may correspond to a sensed voltage which is proportional to the core current. The sensed voltage may e.g. correspond to the voltage drop across the current sensing means. The current source may comprise a voltage amplifier which is configured to amplify the sensed voltage to provide a control voltage. Furthermore, the current source may comprise a pass device (e.g. a transistor, such as a metal oxide semiconductor, (MOS), transistor) which is configured to convert the control voltage into the auxiliary current. The control voltage may be applied to a gate of the transistor of the pass device.

The regulator may be configured to compensate the voltage drop at the current sensing means such that the output voltage is proportional to the input voltage. In particular, the voltage drop at the current sensing means may be compensated such that the output voltage corresponds to (or is equal to) the input voltage. As a result of this, the regulation of the core output voltage by the core regulator leads to a regulation of the output voltage of the regulator.

The regulator may comprise offset circuitry which is configured to offset a core input voltage to the core regulator relative to the input voltage, such that the output voltage is proportional to the input voltage. In particular, the core regulator may be configured to regulate the core output voltage in dependence of (e.g. based on) a core input voltage. The core input voltage may be provided to a positive input of the core regulator and the core output voltage may be fed back to a negative input of the core regulator. As such, the core regulator may be configured to regulate the core output voltage such that it corresponds to the core input voltage. The offset circuitry may be configured to offset the core input voltage (with respect to the input voltage) such that the output voltage of the regulator corresponds to the input voltage.

The offset circuitry may comprise an offset transistor which is configured to provide an offset current in dependence of the control voltage (which is provided by the voltage amplifier). Furthermore, the offset circuitry may comprise an offset resistor arranged in series with the offset transistor. The offset resistor may be configured to convert the offset current into an offset voltage for offsetting the input voltage. Alternatively or in addition, the core regulator may exhibit a negative output impedance, in order to compensate for a sensing resistor comprised within the current sensing means.

The current source may be configured to draw the auxiliary current from a supply voltage of the regulator. As such, the current source may provide the load current for a load of the regulator which is arranged between the output of the regulator and ground. Furthermore, the regulator may comprise a second current source configured to provide a second auxiliary current based on the indication of the core current. The load current may be dependent on the core current and on the second auxiliary current. The second current source may be configured to draw the second auxiliary current from ground. As such, the current source may provide the load current for a load of the regulator which is arranged between the output of the regulator and a supply voltage of the regulator. Hence, the regulator may be configured to operate in a push and in a pull configuration.

According to a further aspect, a method for providing a load current at a regulated output voltage in dependence of an input voltage is described. The method comprises providing a core current at a regulated core output voltage in dependence of the input voltage. Furthermore, the method comprises providing an indication of the core current. The output voltage is dependent on the core output voltage and on a voltage drop at the current sensing means. In addition, the method comprises providing an auxiliary current based on the indication of the core current. The load current is dependent on the core current and on the auxiliary current.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
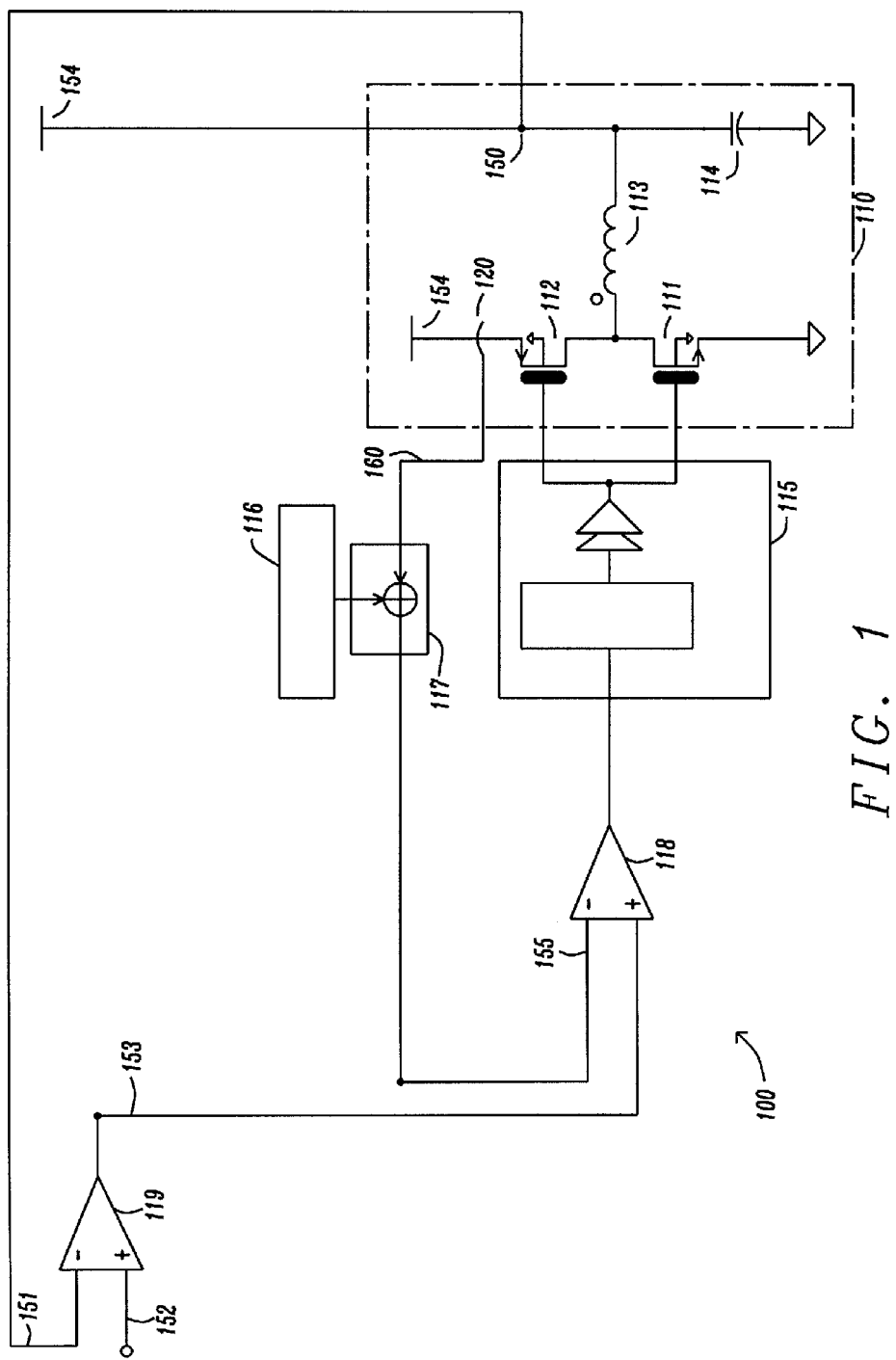
FIG. 1 illustrates a circuit diagram of an example voltage regulator comprising a voltage loop.

FIG. 1 shows an example linear regulator 100 comprising a buck converter 110. The linear regulator 100 comprises a voltage regulation loop. As such, the linear regulator 100 may be used as a core regulator of a regulator comprising a voltage regulation loop and a current regulation loop. The illustrated linear regulator 100 comprises a buck converter 110 comprising a high side switch 112 (e.g. a PMOS transistor) and a low side switch 111 (e.g. a NMOS transistor), as well as a buck inductor 113 and a buck capacitor 114. The duty cycle of the buck converter 110 (i.e. the duty cycle of the high side switch 112) is controlled via a feedback voltage Vfb 151 which is equal to (or proportional to) the output voltage Vout 150. The feedback voltage Vfb 151 is compared to a reference voltage Vref 152 using e.g. a differential amplification unit (also referred to as an error amplifier) 119, thereby providing an error voltage Verror 153. In stable operation, when the output voltage Vout 150 corresponds to the desired output voltage of the linear regulator 100, the error voltage Verror 153 should approximate zero or should take on a pre-determined default error value (e.g. zero) which may be tuned using the reference voltage Vref 152. However, in case of load transients, the output voltage Vout 150 may dip, thereby causing a bump in the error voltage Verror 153 above the default error value.

Overall, the error voltage Verror 153 may be used to regulate the output voltage Vout 150 provided by the linear regulator 100. The regulation of the output voltage Vout 150 may be achieved by controlling the duty cycle of the high side switch 112. This duty cycle may be controlled using the error voltage Verror 153. For example, the error voltage Verror 153 may be compared with a saw wave voltage signal 155 having a pre-determined cycle length (thereby providing a pre-determined and fixed commutation cycle rate). The cycle length typically corresponds to the cycle length of the buck converter 110 (i.e. the length of an on-state and a succeeding off-state of the high side switch 112). The saw wave voltage signal 155 typically has a maximum voltage Vsaw at the peak of each saw tooth. The saw wave voltage signal may be generated by the saw wave generator 116. The saw wave voltage signal 155 is compared to the error voltage Verror 153 using comparator 118 (e.g. a hysteretic comparator), thereby generating a pulse width modulated signal which is negative (or zero) when the saw wave voltage signal is greater than Verror, and positive when the saw wave voltage is smaller than Verror. The transition from negative to positive may be taken as a trigger for the duty cycle. In particular, the pwm (pulse width modulated) signal generated by the comparator 118 may be converted by the buck control unit (also referred to as a control circuit) 115 to generate the drive signals for the high side switch 112 and for the low side switch 111 of the buck converter 110. The regulator 100 can be tuned by appropriately choosing the maximum voltage Vsaw and the reference voltage Vref 152 based on the input voltage Vin 154 and/or based on the desired output voltage 150.

The regulation of the duty cycle of the buck converter 110 can be enhanced by also taking into account the inductor current, i.e. the current through the inductor 113 of the buck converter 110. For this purpose, the regulator 100 comprises current sensing means 120 for sensing the current through the high side transistor 112 (which corresponds to the inductor current when the high side switch 112 is in on-state (and the low side switch 111 is in off-state)). The current sensing means 120 may e.g. be implemented as a current mirror, which mirrors and possibly amplifies the current through the high side switch 112. The sensed current Isns 160 provided by the current sensing means 120 is therefore typically proportional (or equal) to the current through the high side switch 112 (and the inductor 113, when the high side switch is in its on-state). At 100% duty cycle of the buck converter 110 and in stable operation, the current through the high side switch 112 is typically constant and corresponds to the input voltage Vin 154 divided by the impedance of the load Rload of the regulator 100.

The sensed current Isns 160 is added in addition unit 117 to the saw wave signal having the cycle length of the buck converter 110. The adding unit 117 further converts the sum of the saw wave signal and the sensed current Isns 160 into a sensed saw wave voltage Visns 155. The saw wave signal may be generated by the saw wave generator 116 (comprising e.g. a switch (e.g. a transistor) in parallel to a capacitor). Overall, the saw wave generator 116 and the adding unit 117 provide the sensed saw wave voltage Visns 155 which comprises a periodic saw wave voltage signal (generated by the saw wave generator 116) which is offset by a voltage derived from the sensed current Isns 160. As indicated above, Isns 160 is a constant current in case of a stable operation of the buck converter 110 at 100% duty cycle. In such cases, the sensed saw wave voltage Visns 155 corresponds to the periodic saw wave voltage signal offset by a constant voltage derived from the constant current Isns 160. In case of a duty cycle lower than 100%, the sensed current Isns is zero (when the high side switch 112 is in off-state) and has a saw like rising shape (when the high side switch 112 is in on-state). The saw like rising shape of the sense current Isns 160 during the on-state of the high side switch 112 results from the current throttling properties of the inductor (also referred to as a coil) 113. Hence, in cases of a duty cycle of less than 100%, the sensed saw wave voltage Visns 155 is obtained as an overlay of the periodic saw wave voltage signal and an intermittent saw shaped voltage derived from the sensed current Isns 160. It should be noted that the sensed saw wave voltage Visns 155 may be reset every time the high side switch 112 is switched off. The reset of the sensed saw wave voltage Visns 155 may result in a cleaner signal. The sensed saw wave voltage Visns 155 is a signal with a positive slope. Visns 155 crosses the error voltage Verror 153, if the error voltage Verror 153 is in the range which is covered by the sensed saw wave voltage Visns 155 during a clock cycle (i.e. during a commutation cycle).

In the regulator 100 of FIG. 1, the sensed saw wave voltage Visns 155 is compared to the error voltage Verror 153 to generate the pulse width modulated signal pwm towards the driver and controller circuit 115 of the buck converter 110. In case of a load transient (e.g. a sudden increase of the load current), the sensed current Isns 160 increases, thereby increasing the slope of the sensed saw wave voltage Visns 155. At the same time, the output voltage Vout 150 may drop, leading to an increase of the error voltage Verror 153. Both effects tend to move forward the trigger point for the pulse width modulated signal pwm, thereby increasing the duty cycle of the buck converter 110 and thereby compensating the effect of the load transient.

Even with an increase of the duty cycle, the regulator 100 may not be able to provide the requested load current sufficiently fast. This may be due to the ramp of the coil current (which is indicated by the sensed current 160) caused by the inductor 113. A load current (caused by an increasing load transient) which exceeds the coil current typically leads to a drop of the output voltage 150. On the other hand, a load current (caused by a decreasing load transient) which is lower than the coil current typically leads to an increase of the output voltage 150.

A possible way of dealing with load transients is the use of regulators (e.g. linear drop-out, LDO) regulators with external (decoupling or output) capacitors. The external capacitor may be used to provide or to store current subject to a positive load transient or subject to a negative load transient, respectively. However, in such cases, the regulation loop includes the external capacitor and may need to be compensated for over a wide range of load conditions. In such a case, a change in load current may be detected by a change of voltage across the decoupling capacitor. Because the voltage across the decoupling capacitor is the integral of the charge, the change in voltage is delayed. Capacitors may be used to "copy" the current inside the decoupling capacitor (e.g. miller capacitors or current sensors) but such solutions typically lead to restrictions such as the bandwidth of the sensing circuit. Hence, the use of substantial decoupling capacitors leads to regulators having a relatively low bandwidth.

In the present document, the use of (at least) two regulation loops is proposed, in order to provide a high speed regulator with low capacitor values. A first loop may be used for defining the output voltage by a negative feedback. The first loop may exhibit only limited current capability. A second loop may comprise a current amplifier, which acts as a feed-forward stage. The control signal for controlling the second loop may be derived as the voltage drop across a sensing or shunt resistor. This voltage drop typically reflects a change in current immediately. As a consequence, the current amplifier is enabled to react with a high speed. The accuracy of the first and/or second feedback loops may be adjusted during a calibration phase. The proposed regulator (e.g. the proposed LDO) is typically configured to operate with a low quiescent current because no pre-charge is required.

Figure 2:
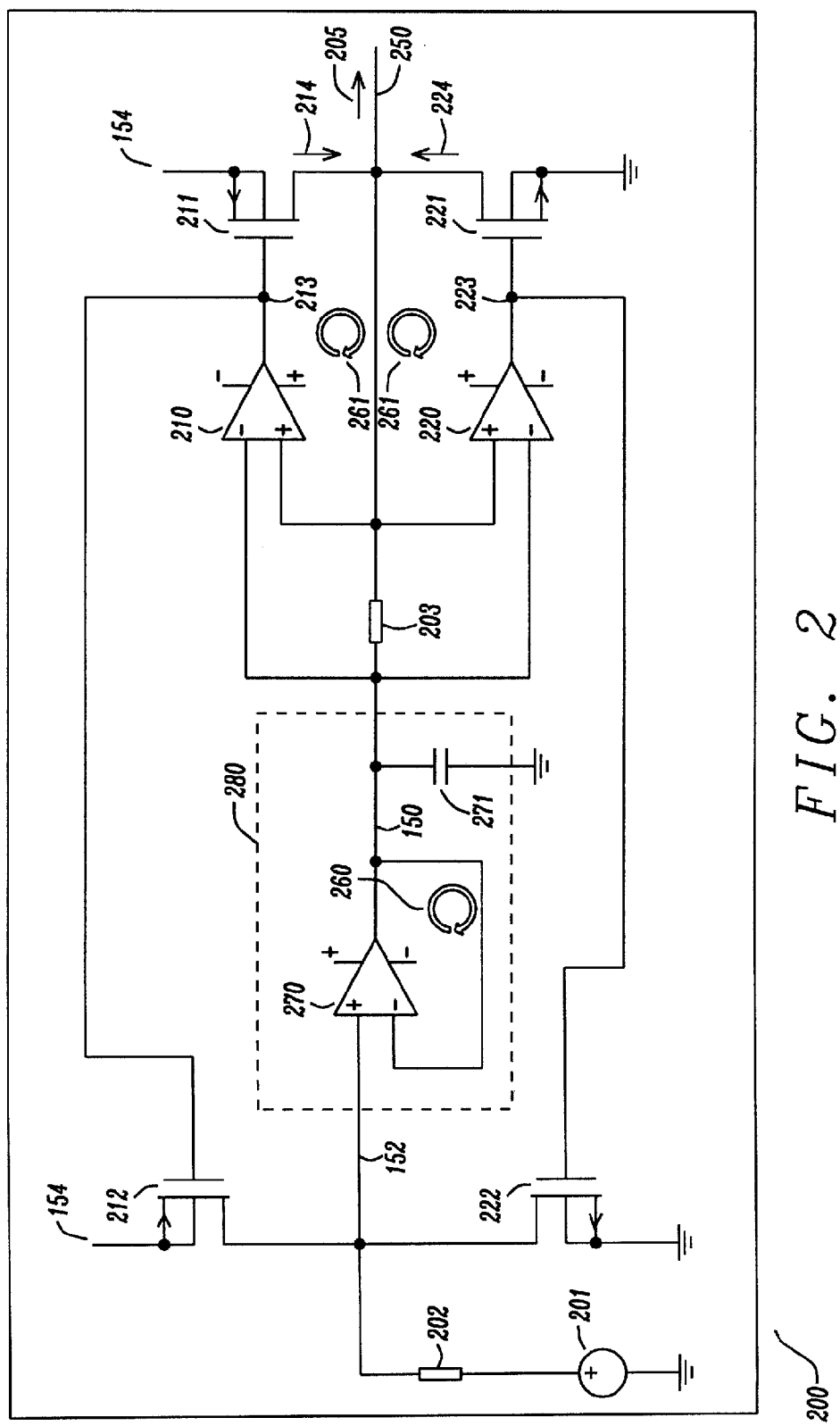
FIG. 2 shows a circuit diagram of an example voltage regulator comprising a voltage loop and a current loop.

FIG. 2 shows a circuit diagram of an example regulator 200 comprising a first loop 260 for regulating the output voltage 250 of the regulator 200. In the illustrated example, a core output voltage 150 of the first loop 260 is regulated using a differential amplifier 270 with the core output voltage 150 being fed back to the negative input of the differential amplifier 270. It should be noted that alternatively or in addition, the regulator 100 of FIG. 1 may be used to provide the first loop 260. The first loop 260 (also referred to as the voltage loop 260 or as the voltage regulation loop 260) may be used to ensure that the core output voltage 150 of the voltage loop 260 corresponds to a desired reference voltage 152. On the other hand, the voltage loop 260 is typically slow with regards to the reaction to load transients.

The first loop 260 comprising a regulator 100 and/or an amplifier 270 may be referred to as a core regulator 280. The core regulator 280 may further comprise a decoupling capacitor 271 at the output of the regulator 100 and/or amplifier 270. The core regulator 280 may be configured to provide the core output voltage 150 in dependence of the reference voltage 152 (also referred to as a core input voltage) at the input of the core regulator 280.

As indicated above, the core regulator 280 is typically directed at the regulation of the output voltage 250 of the regulator 200 (via the core output voltage 150), and is typically slow with regards to the reaction to load transients. For this purpose, the regulator 200 comprises a second loop 261 (also referred to as the current loop 261). In the illustrated example, a push-pull arrangement is illustrated, for the case where a load of the regulator 200 is coupled between the output of the regulator 200 and ground (push), and for the case where the load of the regulator 200 is coupled between the output of the regulator 200 and the supply voltage 154 (pull). For this purpose, the regulator comprises a "push" current loop 261 comprising the voltage amplifier 210 and the pass device (e.g. transistor) 211, and a "pull" current loop 261 comprising the voltage amplifier 220 and the pass device 221. In the following the operation of the current loop 261 is outlined in the context of the "push" current loop 261, which is applicable for the case where the load of the regulator 200 is coupled to ground. The operation of the "pull" current loop 261 is analogous.

The current loop 261 may be used to provide a portion 214 of the load current 205 at the output of the regulator 200, in order to enable the regulator 200 to react to load transients at high speed, without the need for a decoupling capacitor 271 or with a reduced size decoupling capacitor 271. The portion 214 of the load current 205 which is provided by the current loop 261 may be referred to as an auxiliary current 214.

The current loop 261 comprises current sensing means 203 configured to sense the current 204 which is provided by the voltage loop 260 (e.g. by the regulator 100 and/or by the amplifier 270). This current 204 may be referred to as the core current 204. The current sensing means 203 may comprise a shunt or sensing resistor 203. The voltage drop across the shunt resistor 203 is proportional to the core current 204 flowing through the shunt resistor 203. In more general terms, it may be stated that the current sensing means 203 are configured to provide an indication of the core current 204 at the output of the core regulator 280.

The current loop 261 may comprise a current source 210, 211 which is controlled in dependence of the indication of the core current 204. The current source 210, 211 may comprise a differential amplifier (also referred to as a voltage amplifier) 210 configured to amplify the indication of the core current 204 to provide a control signal or control voltage 213. Furthermore, the current source 210, 211 may comprise a pass device 211 configured to provide an auxiliary current 214 in dependence of the control signal 213. Hence, the current source 210, 211 may be configured to provide the auxiliary current 214 in dependence of the indication of the core current 204. In particular, the current source 210, 211 may be configured to provide an auxiliary current 214 which is proportional to the core current 204. The proportionality factor may depend on the gain of the voltage amplifier 210. By way of example, the gain of the amplifier 210 may be 10 or more and/or the auxiliary current 214 may be 10 or more times higher than the core current 204. Consequently, only a relatively small fraction of the load current 205 has to be provided by the core regulator 280 (and by the decoupling capacitor 271).

An output current (also referred to as the load current) 205 of the regulator 200 may be derived from the core current 204 and from the auxiliary current 214. In particular, the output current 205 of the regulator 200 may be given by the sum of the core current 204 and the auxiliary current 214. In view of the fact that the auxiliary current 214 is directly affected by the core current 204, the current loop 261 can react immediately to load transients. In particular, the current loop 261 does not comprise significant capacitances which would negatively affect the reaction speed of the current loop 261.

In an analogous manner to the "push" current loop 261, the "pull" current loop 261 may comprise a current source 220, 221 comprising a differential amplifier (or voltage amplifier) 220 for generating a control signal (or control voltage) 223 and a pass device 221 (e.g. a transistor) for generating an auxiliary current 224. The current source 220, 221 may be configured to provide the auxiliary current 224 in dependence of (e.g. proportional to) the core current 204 sensed by the current sensing means 203. The output current 205 of the regulator 200 then depends on the core current 204 and on the auxiliary current 224.

The output voltage 250 of the regulator 200 depends on the output voltage 150 of the core regulator 280. However, the output voltage 250 of the regulator 200 may deviate from the output voltage 150 of the core regulator 280, notably due to a voltage drop at the current sensing means 203. As a result of this, the output voltage 250 of the regulator 200 may deviate from the input voltage 201 which has been set for the regulator 200. In order to address this issue, the regulator 200 may comprise offset circuitry configured to offset the reference voltage 152 such that the output voltage 250 of the regulator 200 corresponds to the desired value (e.g. to the input voltage 201). The offset circuitry may comprise an offset transistor 212 which is controlled using the control signal 213 at the output of the voltage amplifier 210 of the current loop 261. The control signal 213 may control the offset current through the offset transistor 212. Furthermore, the offset circuitry may comprise an offset resistor 202 which is configured to convert the offset current into an offset voltage. As a result of this, the reference voltage 152 at the input of the amplifier 270 (i.e. the core input voltage) may correspond to a input voltage 201 of the regulator 200 plus the offset voltage. This leads to an increase of the core output voltage 150 at the output of the core regulator 280 and by consequence to an increase of the output voltage 150 of the regulator 200. In particular, this may result in the output voltage 150 of the regulator 200 to correspond to the input voltage 201 of the regulator 200.

In a similar manner, offset circuitry may be provided for the "pull" current loop. In this case, the offset circuitry comprises an offset transistor 222 which is controlled by the control signal 223. The offset current through the offset transistor 222 is converted into an offset voltage using the offset resistor 202.

The offset resistor 202 and the offset transistors 212, 222 may be selected in dependence of the sensing resistor 203 and of the gain of the voltage amplifiers 210, 220. By doing this, it may be ensured that the offset circuitry provides a precise compensation of the voltage drop at the sensing resistor 203.

Hence, the regulator 200 comprises a core amplifier 270 and/or a core regulator 280 which is configured to regulate the core output voltage 150 and/or the output voltage 250. A decoupling capacitor 271 may be used to decouple the output voltages 150, 250 from the input/reference voltage 201, 152. The core regulator 280 forms a voltage loop which may be relatively slow.

As the load increases, this results initially in an increased current to be supplied from the decoupling capacitor 271. This leads to a voltage drop at the shunt resistor 203, i.e. at the current sensing means 203. The current loop senses a load step, i.e. a load transient, across the shunt resistor 203 and reacts immediately by providing an auxiliary current 214, 224. The auxiliary current 214, 224 may correspond to a multiplied current, with respect to the core current 204. In other words, the auxiliary current 214, 224 may correspond to the core current 204 multiplied by a gain value. The gain value depends on the gain of the voltage amplifiers 210, 220 of the current loop 261. Which one of the voltage amplifiers 210, 111 or 220, 221 are used for providing the auxiliary current 214, 224 depends on the polarity of the load. The provision of the auxiliary current 214, 224 reduces the core current 204, thereby reducing the voltage drop across the shunt resistor 203 to its static value which is delivered by the core regulator 280.

A relatively small decoupling capacitor (not shown) at the output of the regulator 200 may be added to reduce voltage peaking, subject to a load transient.

The current loops 261 may comprise amplifiers 210, 220 having a high Gain-Bandwidth product (GBW) and relatively low gain (20 to 30 dB). The output impedance of the regulator may correspond to the resistance of the shunt resistor 203 divided by the gain of the current loop 261 (i.e. the gain of the current amplifier 210, 211 or 220, 221) plus the output impedance of the voltage loop 260.

The voltage drop caused by the output impedances may be compensated using the offset resistor 202 in conjunction with the offset transistors 212 or 222, wherein the offset transistors 212 or 222 are controlled based on the core current 204. Effectively, the voltage loop 260 exhibits a negative output impedance, in order to cancel the voltage drop across the shunt resistor 203. Hence, the additional voltage drop at the sensing resistor 203 may be compensated by the voltage loop 260 in a feed-forward manner.

Alternatively or in addition, the voltage loop 260, i.e. the core regulator 280, may comprise an amplifier 270 having a negative output impedance, thereby reducing the overall output impedance of the regulator 200 and thereby cancelling the voltage drop across the shunt resistor 203.

It should be noted that it is preferable to not compensate the additional voltage drop at the sensing resistor 203 by negative feedback of the voltage loop 260, as this may lead to a reduced regulation speed. In particular, such a negative feedback may negatively impact the control signal across the sensing resistor 203.

Figure 3:
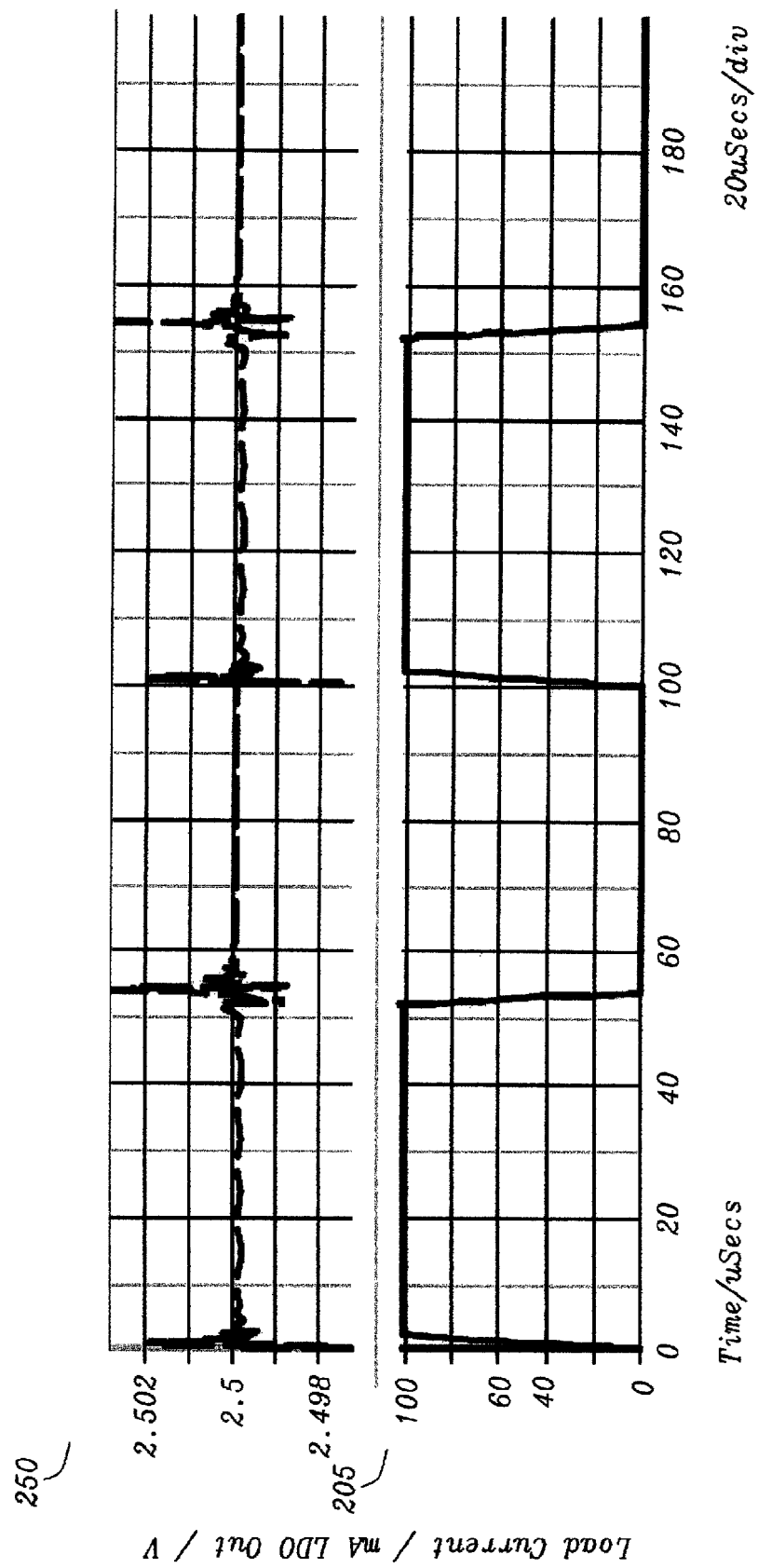
FIG. 3 shows an example output voltage subject to an example load current.

Experiments have shown that the regulator 200 exhibits no substantial voltage drop and that the load regulation exhibits variations of only a few (mVs). This is illustrated in FIG. 3 which shows the output voltage 250 of the regulator 200 subject to load transients, i.e. subject to transients of the load current 205.

The provision of a regulator 200 comprising two loops enables the use of amplifiers have different GBWs and overall gain. As a result of this, a stable regulator 200 may be provided over a wide range of bandwidths and load currents.

As such, the regulator 200 is configured to rapidly react to a load transient. Initially, an additional load current may be provided by the capacitor 271. Subsequently, the external regulator takes over and provides the additional load current using the transistors 211, 221. The additional load current is translated by the current sensing means 203 into a voltage transient. The voltage transient is translated into an auxiliary current 214, 224 using the amplifiers 210, 211 or 220, 221, respectively. A positive feedback may be used to compensate for the voltage drop at the current sensing means 203. This corresponds to a negative impedance.

Figure 4:
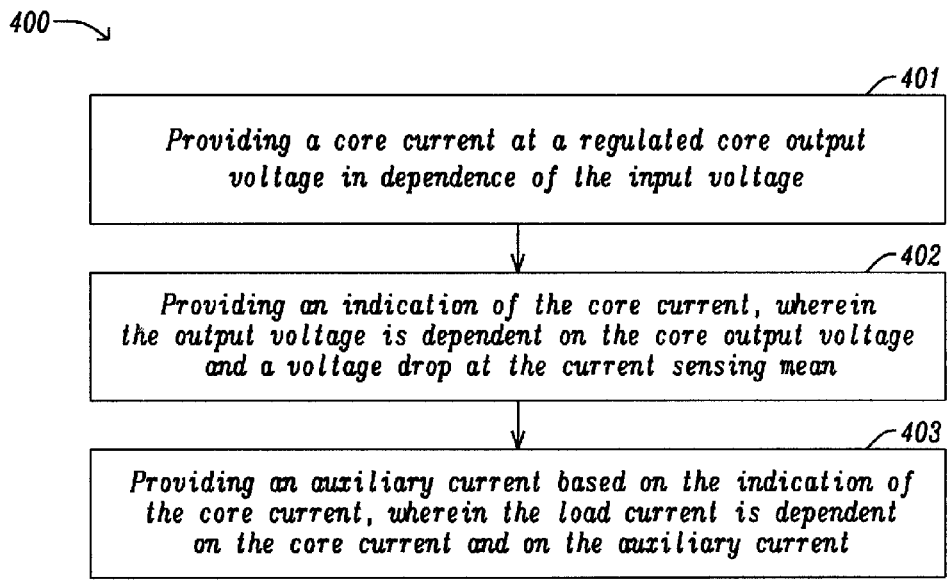
FIG. 4 shows a flow chart of an example method for providing a load current at a regulated output voltage.

FIG. 4 shows a flow chart of an example method 400 for providing a load current 205 at a regulated output voltage 250 in dependence of an input voltage 201. The method 400 comprises providing 401 a core current 204 at a regulated core output voltage 150 in dependence of the input voltage 201. This may be achieved using a core regulator 280. Furthermore, the method 400 comprises providing 402 an indication of the core current 204, e.g. using a sensing resistor 203 which is traversed by the core current 204. The output voltage 250 is provided in dependence on the core output voltage 150 and on a voltage drop at the current sensing means 203. In addition, the method 400 comprises providing 403 an auxiliary current 214 based on the indication of the core current 204. The load current 205 is provided in dependence on the core current 204 and on the auxiliary current 214.

Figure 5:
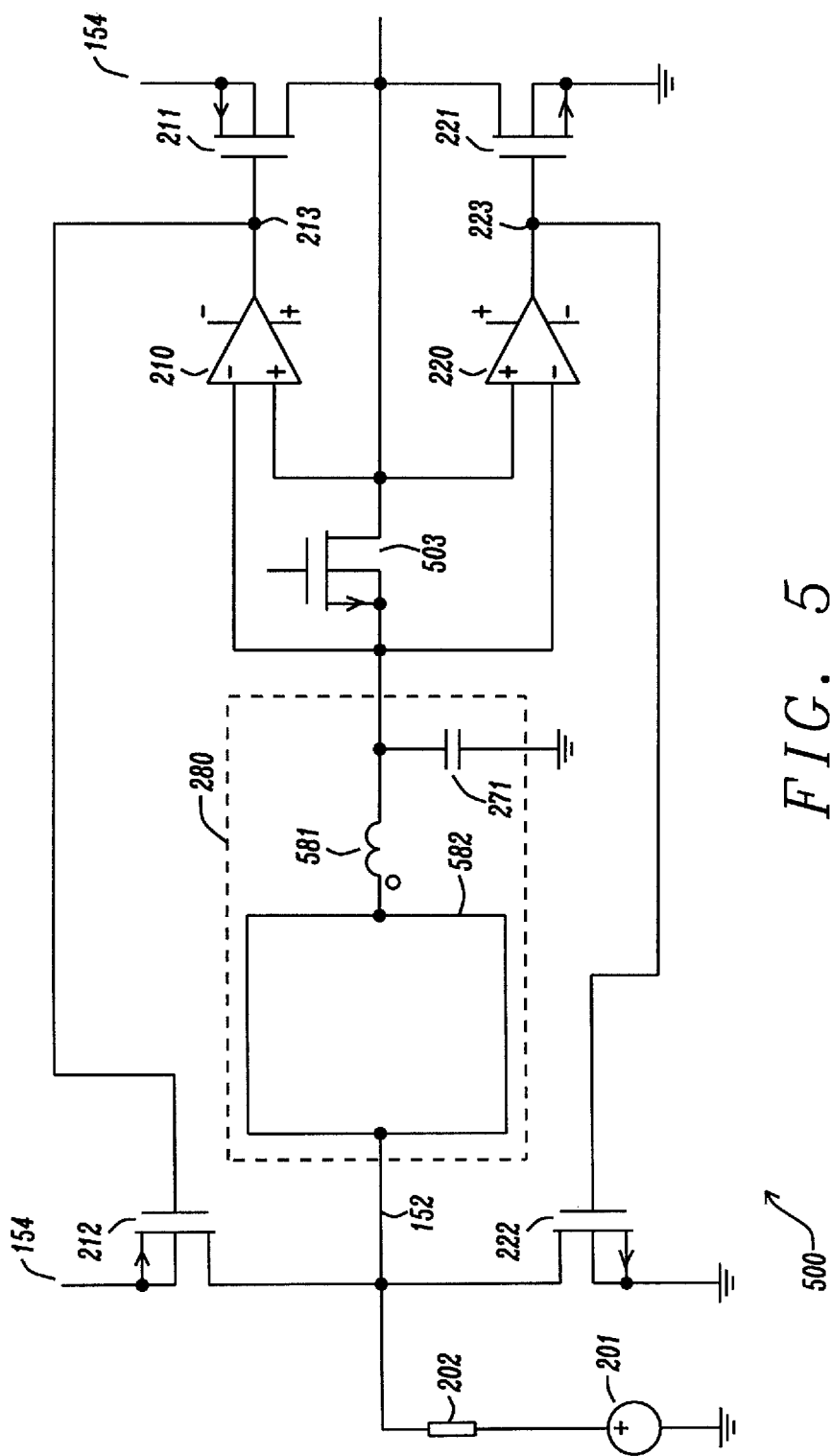
FIG. 5 shows a circuit diagram of another example voltage regulator comprising a voltage loop and a current loop.

FIG. 5 shows a circuit diagram of another example regulator 500. The regulator 500 comprises a core regulator 280 comprising a switched mode power supply or a switched mode power converter. The switched mode power supply comprises a switching network 582 and an inductor element 581. Furthermore, the regulator 500 comprises current sensing means 503 comprising a variable resistance. In the illustrated example, the variable resistance is implemented using a transistor.

The decoupling capacitor 271 corresponds to the output node of the switched mode power supply. The transistor 503 acts as a variable resistor. In the case that the regulator 500 is not submitted to a load change or does not expect a load change, the transistor 503 is switched on and therefore exhibits a relatively low voltage drop. If a load change is expected, this information may be available at an electronic device comprising the regulator 500. The regulator 500 may then be configured to increase the resistance of the transistor 503 (by partially closing the transistor 503). As a result of this, there is a voltage drop at the transistor 503 and the output stages 211, 221 take over the load. The load change can be handled by the output stages 211, 221. Subsequent to the load change, the transistor 503 may be opened again to reduce the resistance and to reduce power losses of the regulator 500 for steady load conditions. As a result of this, a power efficient regulator 500 having a fast response to load transients is provided.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A regulator configured to provide a load current at an output voltage in dependence of an input voltage; wherein the regulator comprises
   a core regulator configured to provide a core current at a core output voltage in dependence of the input voltage;
   current sensing means configured to provide an indication of the core current;
   wherein the output voltage is dependent on the core output voltage and on a voltage drop at the current sensing means;
   a current source configured to provide an auxiliary current based on the indication of the core current; wherein the load current is dependent on the core current and on the auxiliary current; and
   offset circuitry configured to offset a core input voltage to the core regulator relative to the input voltage, such that the output voltage is proportional to the input voltage, thereby compensating the voltage drop at the current sensing means.

2. The regulator of claim 1, wherein the load current is dependent on the sum of the core current and of the auxiliary current.

3. The regulator of claim 1, wherein the output voltage is dependent on the core output voltage minus the voltage drop at the current sensing means.

4. The regulator of claim 1, wherein the core regulator comprises
   a core amplifier configured to provide the core current at the core output voltage; and
   a voltage feedback loop configured to feed back an indication of the core output voltage to an input of the core amplifier.

5. The regulator of claim 1, wherein
   the current sensing means comprise a sensing resistor which is traversed by the core current; and
   the indication of the core current comprises a voltage drop at the sensing resistor.

6. The regulator of claim 5, wherein
   the sensing resistor is adjustable; and
   the regulator is configured to adjust the sensing resistor in dependence of the load current.

7. The regulator of claim 1, wherein the current source is configured to provide an auxiliary current which is proportional to the indication of the core current.

8. The regulator of claim 1, wherein
   the indication of the core current corresponds to a sensed voltage proportional to the core current;
   the current source comprises a voltage amplifier configured to amplify the sensed voltage to provide a control voltage; and
   the current source comprises a pass device configured to convert the control voltage into the auxiliary current.

9. The regulator of claim 8, wherein
   the pass device comprises transistor; and
   the control voltage is applied to a gate of the transistor.

10. The regulator of claim 1, wherein the offset circuitry comprises
    an offset transistor which is configured to provide an offset current in dependence of the control voltage; and
    an offset resistor arranged in series to the offset transistor configured to convert the offset current into an offset voltage for offsetting the input voltage.

11. The regulator of claim 1, wherein the core regulator exhibits a negative output impedance.

12. The regulator of claim 1, wherein
    the current source is configured to draw the auxiliary current from a supply voltage of the regulator;
    the regulator comprises a second current source configured to provide a second auxiliary current based on the indication of the core current; wherein the load current is dependent on the core current and on the second auxiliary current; and
    the second current source is configured to draw the second auxiliary current from ground.

13. A method for providing a load current at a regulated output voltage in dependence of an input voltage; wherein the method comprises
    providing a core current at a regulated core output voltage in dependence of the input voltage using a core regulator;
    providing an indication of the core current using current sensing means; wherein the output voltage is dependent on the core output voltage and on a voltage drop at the current sensing means;
    providing an auxiliary current based on the indication of the core current;
    wherein the load current is dependent on the core current and on the auxiliary current; and
    offsetting a core input voltage to the core regulator relative to the input voltage, such that the output voltage is proportional to the input voltage, thereby compensating the voltage drop at the current sensing means.

14. The method of claim 13 wherein further comprises a current sensing means wherein said current sensing means comprises a sensing resistor which is traversed by the core current.

15. The method of claim 14 wherein the indication of the core current comprises a voltage drop at the sensing resistor.

16. The method of claim 14 wherein said sensing resistor is adjustable.

17. The method of claim 16 wherein the regulator adjusts said sensing resistor in dependence of the load current.

18. The method of claim 15 wherein the indication of the core current corresponds to a sensed voltage proportional to the core current.

19. The method of claim 18 wherein the current source comprises a voltage amplifier amplifying the sensed voltage to provide a control voltage.

20. The method of claim 19 wherein the current source comprises a pass device converting the control voltage into the auxiliary current.

\* \* \* \* \*